(12) United States Patent
Shibanuma et al.

(10) Patent No.: US 12,160,115 B2
(45) Date of Patent: Dec. 3, 2024

(54) DYNAMIC POWER SUPPLY SYSTEM

(71) Applicant: DENSO CORPORATION, Kariya (JP)

(72) Inventors: Mitsuru Shibanuma, Kariya (JP);
Masaki Kanesaki, Kariya (JP);
Nobuhisa Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 103 days.

(21) Appl. No.: 17/535,836

(22) Filed: Nov. 26, 2021

(65) Prior Publication Data

US 2022/0085658 A1    Mar. 17, 2022

Related U.S. Application Data

(63) Continuation of application No. PCT/JP2020/019897, filed on May 20, 2020.

(30) Foreign Application Priority Data

May 27, 2019   (JP) ................................. 2019-098187

(51) Int. Cl.
*H02J 50/12*   (2016.01)
*H02J 50/40*   (2016.01)
*H02J 50/90*   (2016.01)
*B60L 53/12*   (2019.01)

(52) U.S. Cl.
CPC .............. *H02J 50/12* (2016.02); *H02J 50/40* (2016.02); *H02J 50/90* (2016.02); *B60L 53/12* (2019.02)

(58) Field of Classification Search
CPC .. H02J 50/12; H02J 50/40; H02J 50/90; H02J 50/80; H02J 2207/20; H02J 7/02; H02J 50/402; B60L 53/12; B60L 53/122; B60L 53/38

See application file for complete search history.

(56) References Cited

U.S. PATENT DOCUMENTS

| 9,608,465 | B2 | 3/2017 | Keeling et al. | |
|---|---|---|---|---|
| 2014/0103871 | A1* | 4/2014 | Maikawa | H02J 50/90 320/108 |
| 2015/0028691 | A1* | 1/2015 | Yamauchi | H02J 50/12 307/104 |
| 2015/0303714 | A1* | 10/2015 | Keeling | B60L 53/66 320/108 |

(Continued)

FOREIGN PATENT DOCUMENTS

JP      2017-147821 A    8/2017

*Primary Examiner* — Daniel Kessie
*Assistant Examiner* — Brian K Baxter
(74) *Attorney, Agent, or Firm* — Oliff PLC

(57) ABSTRACT

A period for performing pre-power-supply check prior to main power supply from a power supply device to a power reception device is provided and, a power-receiving-side controller is configured to: check a supplied electric power supplied from the power supply device to the power reception device, in a state where an effective value of an output voltage of a inverter circuit is fixed to a predetermined first voltage by the power-supply-side controller and an input voltage of the DC-DC converter is fixed to a predetermined second voltage by the power-receiving-side controller, in the pre-power-supply check, and cause, in response to the supplied electric power being equal to a predetermined electric power or more, the power supply device to start the main power supply.

7 Claims, 6 Drawing Sheets

(56) References Cited

U.S. PATENT DOCUMENTS

| | | | |
|---|---|---|---|
| 2016/0141919 A1* | 5/2016 | Ohashi | H02J 50/80 |
| | | | 320/108 |
| 2017/0087998 A1* | 3/2017 | Minamii | H02J 7/1423 |
| 2017/0113557 A1* | 4/2017 | Tsukamoto | H02J 50/90 |
| 2018/0090997 A1* | 3/2018 | Iwamura | B26B 19/38 |
| 2018/0123397 A1* | 5/2018 | Tsukiyama | H02J 50/12 |
| 2021/0001732 A1* | 1/2021 | Il | B60M 7/00 |

\* cited by examiner

DYNAMIC POWER SUPPLY SYSTEM

CROSS-REFERENCE TO RELATED APPLICATION

The present application is a continuation application of International Application No. PCT/JP2020/019897, filed on May 20, 2020, which claims priority to Japanese Patent Application No. 2019-098187, filed on May 27, 2019. The contents of these applications are incorporated herein by reference in their entirety.

BACKGROUND

Technical Field

The present disclosure relates to a dynamic power supply system that supplies an electric power to a vehicle in motion.

Background Art

A wireless power reception device that wirelessly receives electric power while a vehicle is in motion has been disclosed. When a detection value based on a voltage generated in a power receiver of a wireless power reception device or a current flowing through the power receiver becomes a reference value or more, this system causes a charging operation of a power charger to start, and when the detection value falls below the reference value, this system causes the charging operation of the power charger to stop and supplies electric power from a capacitor unit to the power charger.

SUMMARY

In the present disclosure, provided is a dynamic power supply system as the following.

A period for performing pre-power-supply check prior to main power supply from a power supply device to a power reception device is provided and, a power-receiving-side controller is configured to: check a supplied electric power supplied from the power supply device to the power reception device, in a state where an effective value of an output voltage of a inverter circuit is fixed to a predetermined first voltage by a power-supply-side controller and an input voltage of a DC-DC converter is fixed to a predetermined second voltage by the power-receiving-side controller, in the pre-power-supply check, and cause, in response to the supplied electric power being equal to a predetermined electric power or more, the power supply device to start the main power supply.

DETAILED DESCRIPTION OF THE PREFERRED EMBODIMENTS

Japanese Patent Application Laid-Open No. 2017-147821 discloses a wireless power reception device that wirelessly receives electric power while a vehicle is in motion. However, a voltage to be stored in a capacitor of a power reception device varies with a voltage (inverter voltage) generated in a power-supply-side power supply device, which sometimes makes it difficult to determine whether a vehicle is at a position suitable for battery charging. It is also of concern that if the vehicle is not at the suitable position, an inverter circuit of the power supply device will cause an unnecessary current not contributing to battery charge to flow. This results in generation of a loss and, consequently, generation of a leakage magnetic field.

According to an aspect of the present disclosure, a dynamic power supply system in which electric power is supplied from a power supply device to a power reception device is provided. In the dynamic power supply system, the power supply device includes: an inverter circuit configured to output an alternating current; a power transmitter connected to the inverter circuit and configured to transmit an alternating-current electric power; a power-supply-side controller configured to control the inverter circuit; and a power-supply-side communicator, and the power reception device includes: a power receiver configured to receive the alternating-current electric power transmitted from the power transmitter; a rectifier circuit connected to the power receiver and configured to rectify the received alternating-current electric power; a DC-DC converter connected to the rectifier circuit and configured to convert and output a voltage; a battery connected to an output of the DC-DC converter; a load configured to operate with the received electric power; a power-receiving-side controller configured to control the DC-DC converter; and a power-receiving-side communicator, in which the power-receiving-side controller is configured to: check a supplied electric power supplied from the power supply device to the power reception device, in a state where an effective value of an output voltage of the inverter circuit is fixed to a predetermined first voltage by the power-supply-side controller and an input voltage of the DC-DC converter is fixed to a predetermined second voltage by the power-receiving-side controller, in a pre-power-supply check, and cause, in response to the supplied electric power being equal to a predetermined electric power or more, the power supply device to start the main power supply. According to this aspect, it is possible to determine whether a vehicle is at a suitable position for battery charging and start main power supply without causing an unnecessary current not contributing to battery charge to flow.

Figure 1:
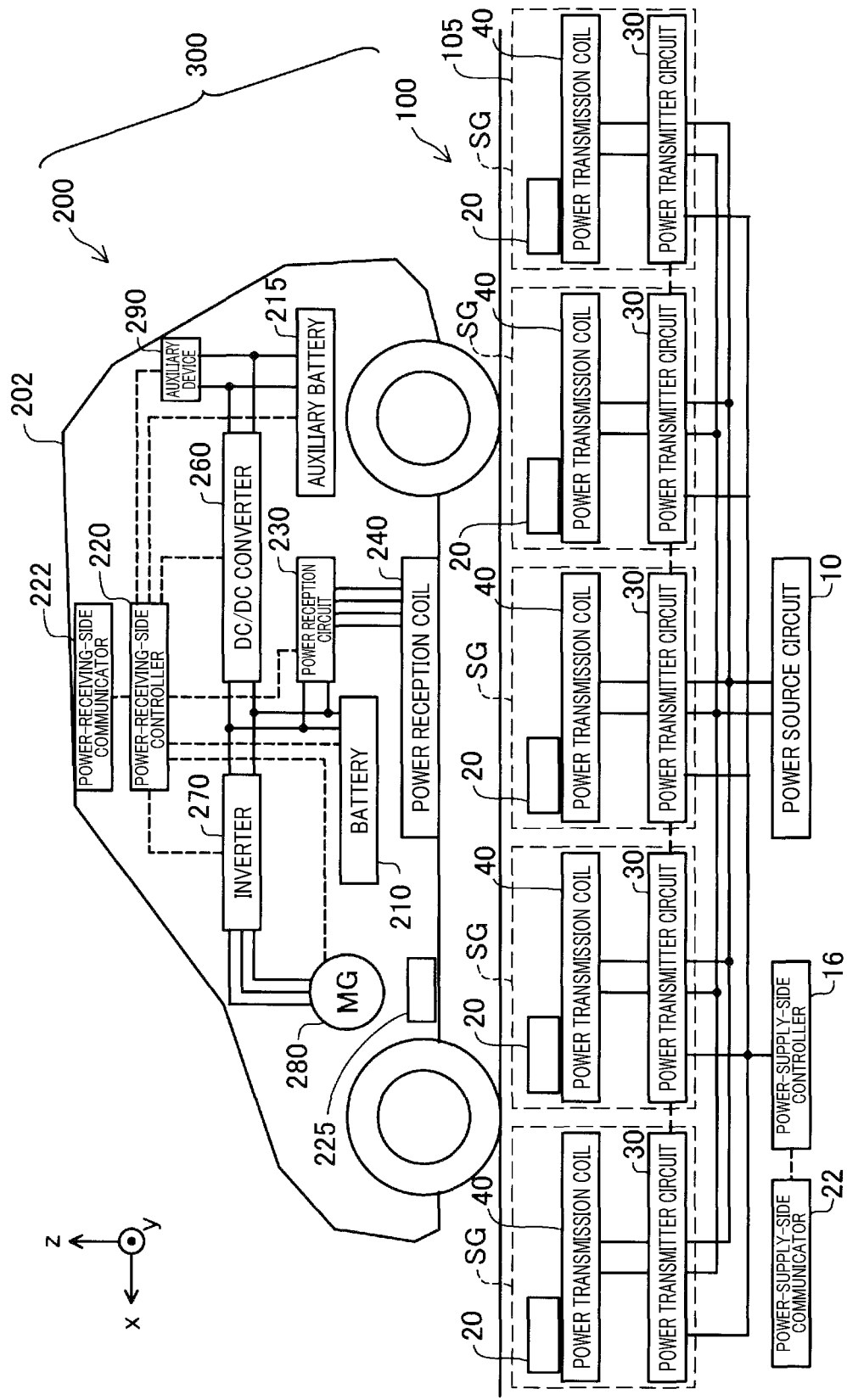
FIG. 1 is an explanatory diagram explaining a non-contact power supply system.

As illustrated in FIG. 1, a dynamic power supply system 300 includes a power supply device 100 on a road 105 side and a power reception device 200 on a vehicle 202 side. The dynamic power supply system 300 is a system enabling electric power to be supplied from the power supply device 100 to the vehicle 202 while the vehicle 202 is in motion. The vehicle 202 is in the form of, for example, an electric vehicle or a hybrid vehicle. In FIG. 1, an x-axis direction represents a forward movement direction of the vehicle 202, a y-axis direction represents a width direction of the vehicle 202, and a z-axis direction is a vertically upward direction.

The power supply device 100 on the road 105 side includes a plurality of coils 40 for power transmission (hereinafter, also referred to as "power transmission coils 40"), a plurality of power transmitter circuits 30 each of which supplies an alternating-current voltage to the corresponding one of the plurality of power transmission coils 40, a plurality of vehicle position detectors 20 each provided for the corresponding one of the power transmitter circuits 30 or the power transmission coils 40, a power source circuit 10 that supplies a direct-current voltage to the plurality of power transmitter circuits 30, a power-supply-side controller 16, a vehicle position detector 20, and a power-supply-side communicator 22.

The plurality of power transmission coils 40 are installed along the x-axis direction at a predetermined depth from a ground surface of the road 105. Each power transmitter circuit 30, which is a circuit that converts the direct-current voltage supplied from the power source circuit 10 to a high-frequency alternating-current voltage and applies it to the corresponding one of the power transmission coils 40, includes an inverter circuit and a resonance circuit. It should be noted that each power transmitter circuit 30 may include a filter circuit in addition to the inverter circuit and the resonance circuit. Each power transmission coil 40 and the corresponding one of the power transmitter circuits 30 are collectively referred to as "a power supply segment SG." It should be noted that the power supply segment SG is sometimes simply referred to as "a segment SG." The power source circuit 10 is a circuit that supplies a direct-current electric power to the power transmitter circuits 30. For example, the power source circuit 10 is in the form of an AC/DC converter circuit that rectifies an alternating current supplied from a commercial power source and outputs a direct current. It should be noted that the direct current outputted from the power source circuit 10 is not necessarily a completely direct current and may contain some fluctuations (ripples).

Each vehicle position detector 20 detects a position of the vehicle 202. Each vehicle position detector 20 communicates with, for example, a vehicle-side position sensor 225 provided in the vehicle 202 and detects whether the vehicle 202 is on the segments SG by using a strength of the communication. The plurality of power transmitter circuits 30 perform power transmission using one or more of the power transmission coils 40 close to the vehicle 202 in accordance with the position of the vehicle 202 detected by the vehicle position detectors 20. The power-supply-side controller 16 controls power supply from the segments SG. It should be noted that each vehicle position detector 20 may detect the position of the vehicle 202 by using a camera, a search coil, or a laser.

The power-supply-side communicator 22 communicates with a power-receiving-side communicator 222 provided in the vehicle 202. The communication includes, for example, instructions for power supply and instructions for main power supply.

The vehicle 202 includes a battery 210, an auxiliary battery 215, a power-receiving-side controller 220, the vehicle-side position sensor 225, a power reception circuit 230, a power reception coil 240, a DC/DC converter circuit 260, an inverter circuit 270, a motor generator 280, and an auxiliary device 290. The power reception coil 240 is connected to the power reception circuit 230 and an output of the power reception circuit 230 is connected to the battery 210, a high-voltage side of the DC/DC converter circuit 260, and the inverter circuit 270. A low-voltage side of the DC/DC converter circuit 260 is connected to the auxiliary battery 215 and the auxiliary device 290. The inverter circuit 270 is connected to the motor generator 280.

The power reception coil 240 is a device that generates an induced electromotive force by electromagnetic induction between the power reception coil 240 and the power transmission coils 40. The power reception circuit 230 includes a rectifier circuit that converts the alternating-current voltage outputted from the power reception coil 240 to a direct-current voltage and a DC/DC converter circuit that converts the direct-current voltage generated by the rectifier circuit to a voltage suitable for charging the battery 210. The direct-current voltage outputted from the power reception circuit 230 is usable for charging the battery 210 and for driving the motor generator 280 via the inverter circuit 270. The direct-current voltage is also usable for charging the auxiliary battery 215 and for driving the auxiliary device 290 as long as stepped down through the DC/DC converter circuit 260. Alternatively, a plurality of power reception coils 240 may be installed. By virtue of the plurality of power reception coils 240 being installed, it is possible to provide a robust optimal design against misalignment of the vehicle 202. Further, in a case where the plurality of power reception coils 240 are installed, the power reception circuit 230 may be polyphase. By virtue of being polyphase, the power reception circuit 230 can be provided as a single circuit and an installation space in the vehicle 202 can be reduced.

The battery 210 is a secondary battery that outputs a relatively high direct-current voltage for driving the motor generator 280. The motor generator 280 operates as a three-phase alternating-current motor, generating a driving force for causing the vehicle 202 to travel. The motor generator 280 operates as a generator during deceleration of the vehicle 202, regenerating electric power. With the motor generator 280 operating as a motor, the inverter circuit 270 converts electric power from the battery 210 to three-phase alternating current and supplies it to the motor generator 280. With the motor generator 280 operating as a generator, the inverter circuit 270 converts the three-phase alternating current regenerated by the motor generator 280 to a direct current and supplies it to the battery 210.

The DC/DC converter circuit 260 converts an output of the battery 210 to a voltage lower than an output voltage of the battery 210 and supplies it to the auxiliary battery 215 and the auxiliary device 290. The auxiliary battery 215 is a secondary battery for driving the auxiliary device 290 and a voltage thereof is relatively low. The auxiliary device 290 includes a variety of peripherals of the vehicle 202, such as an air conditioner, an electric power steering device, a headlight, a turn signal, and a wiper, and a variety of accessories of the vehicle 202.

The power-receiving-side controller 220 controls the inverter circuit 270 inside the vehicle 202 and other components. In receiving dynamic non-contact power supply, the power-receiving-side controller 220 controls the power reception circuit 230, performing a power receiving process.

Figure 2:
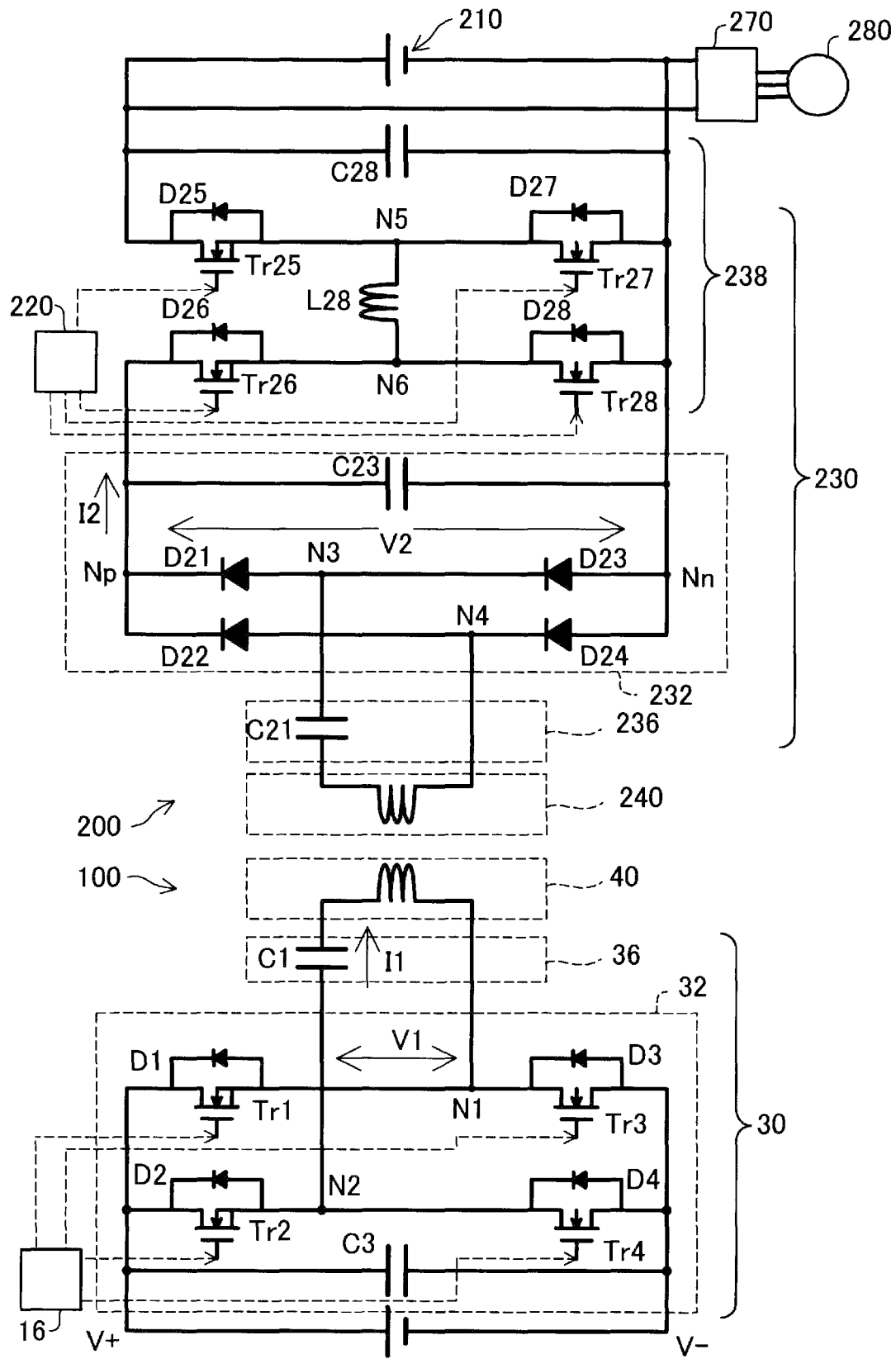
FIG. 2 is an explanatory diagram explaining circuits of a power supply device and a power reception device.

As illustrated in FIG. 2, the power supply device 100 on the road 105 side includes the power transmitter circuits 30 and the power transmission coils 40. Each power transmitter circuit 30 includes an inverter circuit 32 and a resonance circuit 36. The inverter circuit 32 includes four switching transistors Tr1 to Tr4, a capacitor C3, and four protection diodes D1 to D4. The four switching transistors Tr1 to Tr4 provide an H-bridge circuit. The switching transistors Tr1 and Tr3 are connected to each other in series, whereas the switching transistors Tr2 and Tr4 are connected to each other in series. The switching transistors Tr1, Tr2 are connected to a positive-side power source line V+, whereas the switching transistors Tr3, Tr4 are connected to a negative-side power source line V−. An intermediate node N1 between the switching transistors Tr1 and Tr3 and an intermediate node N2 between the switching transistors Tr2 and Tr4 are connected to the power transmission coil 40 through the resonance circuit 36. Each of the switching transistors Tr1 to Tr4 is connected to the corresponding one of the protection diodes D1 to D4 in parallel. The capacitor C3 is a smoothing capacitor provided between the positive-side power source line V+ and a negative-side power source line V−. The switching transistors Tr2 and Tr3 are off while the switching transistors Tr1 and Tr4 are on, whereas the switching transistors Tr1 and Tr4 are off while the switching transistors Tr2 and Tr3 are on.

The resonance circuit 36 includes a capacitor C1 inserted in series between the power transmission coil 40 and the inverter circuit 32. Thus, the resonance circuit 36 is in the form of a series resonance circuit in the present embodiment. It should be noted that the capacitor C1 may be in the form of a parallel resonance circuit connected to the power transmission coil 40 in parallel instead of a series resonance circuit.

Figure 3:
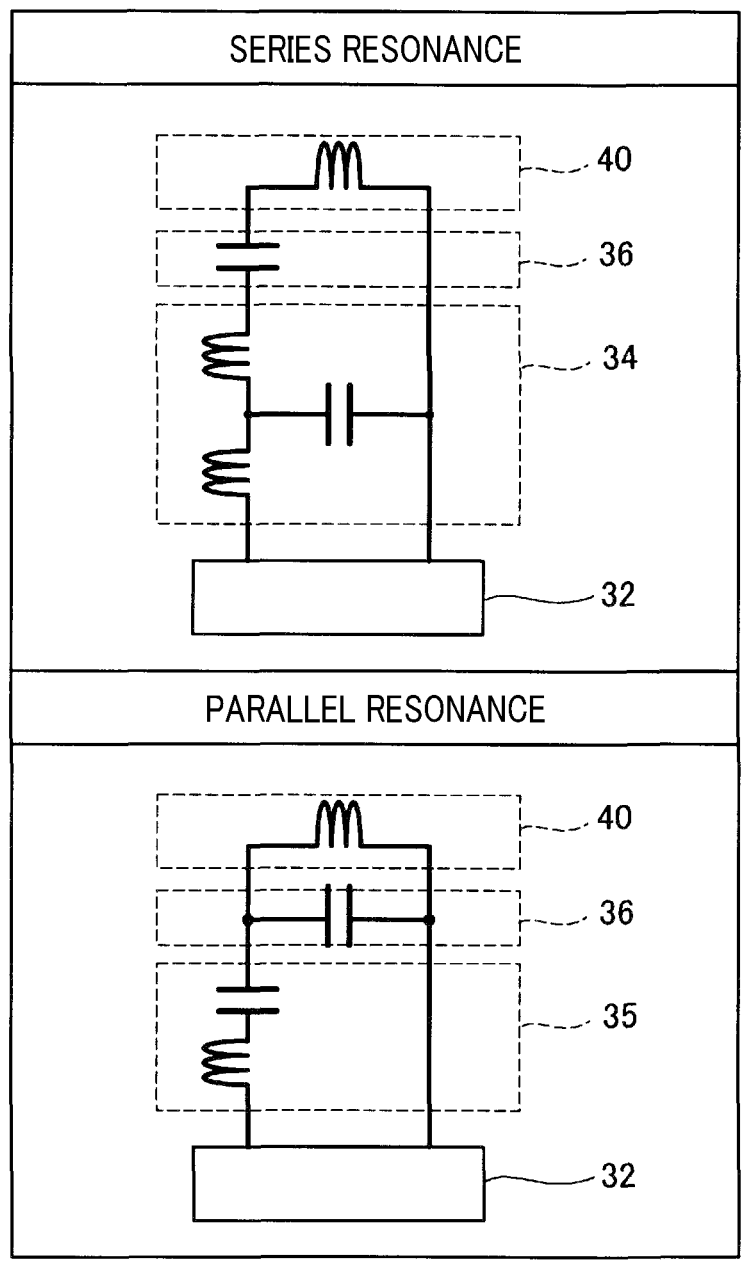
FIG. 3 is an explanatory diagram explaining a resonance circuit and a filter circuit of the power supply device.

As illustrated in FIG. 3, a filter circuit may be provided between the inverter circuit 32 and the resonance circuit 36. In a case where the resonance circuit 36 is a series resonance circuit, for example, a T-shaped filter circuit 34 including two coils and one capacitor may be used as the filter circuit. In contrast, in a case where the resonance circuit 36 is a parallel resonance circuit, the filter circuit may be a band-pass filter circuit 35 with a coil and a capacitor connected in series.

The vehicle-side power reception device 200 includes the power reception circuit 230 and the power reception coil 240. The power reception circuit 230 includes a resonance circuit 236, a rectifier circuit 232, and a DC-DC converter circuit 238. The resonance circuit 236 includes a capacitor C21 connected to the power reception coil 240 in series. Thus, the resonance circuit 236 is a series resonance circuit in the present embodiment. It should be noted that a parallel resonance circuit with the capacitor C21 connected to the power reception coil 240 in parallel may be used instead of a series resonance circuit. A filter circuit as in the power supply device 100 may be provided between the resonance circuit 236 and the rectifier circuit 232.

The rectifier circuit 232, which is a bridge rectifier circuit, includes four rectifier diodes D21 to D24 and a smoothing capacitor C23. The rectifier diodes D21 and D23 are connected to each other in series with an intermediate node N3 therebetween connected to the capacitor C21 of the resonance circuit 236, whereas the rectifier diodes D22 and D24 are connected to each other in series with an intermediate node N4 therebetween connected to the power reception coil 240. Respective cathodes of the rectifier diodes D21 and D22 are connected to a node Np, whereas respective anodes of the rectifier diodes D23 and D24 are connected to a node Nn. The smoothing capacitor C23 is connected to the node Np and the node Nn.

The DC-DC converter circuit 238 is a circuit that steps up or down the direct-current voltage rectified by the rectifier circuit 232 and supplies it to the battery 210. The DC-DC converter circuit 238 includes four switching transistors Tr25 to Tr28, an inductor L28, protection diodes D25 to D28, and a smoothing capacitor C28. The switching transistors Tr25 and Tr27 are connected to each other in series between the node Np and the node Nn, whereas the switching transistors Tr26 and Tr28 are connected to each other in series. The inductor L28 is connected to an intermediate node N5 between the switching transistors Tr25 and Tr27 and an intermediate node N6 between the switching transistors Tr26 and Tr28. Each of the switching transistors Tr25 to Tr28 is connected to the corresponding one of the protection diodes D25 to D28 in parallel. The smoothing capacitor C28 is provided closer to the battery 210 than the four switching transistors Tr25 to Tr28.

The battery 210 is connected to the motor generator 280 through the inverter circuit 270.

Figure 4:
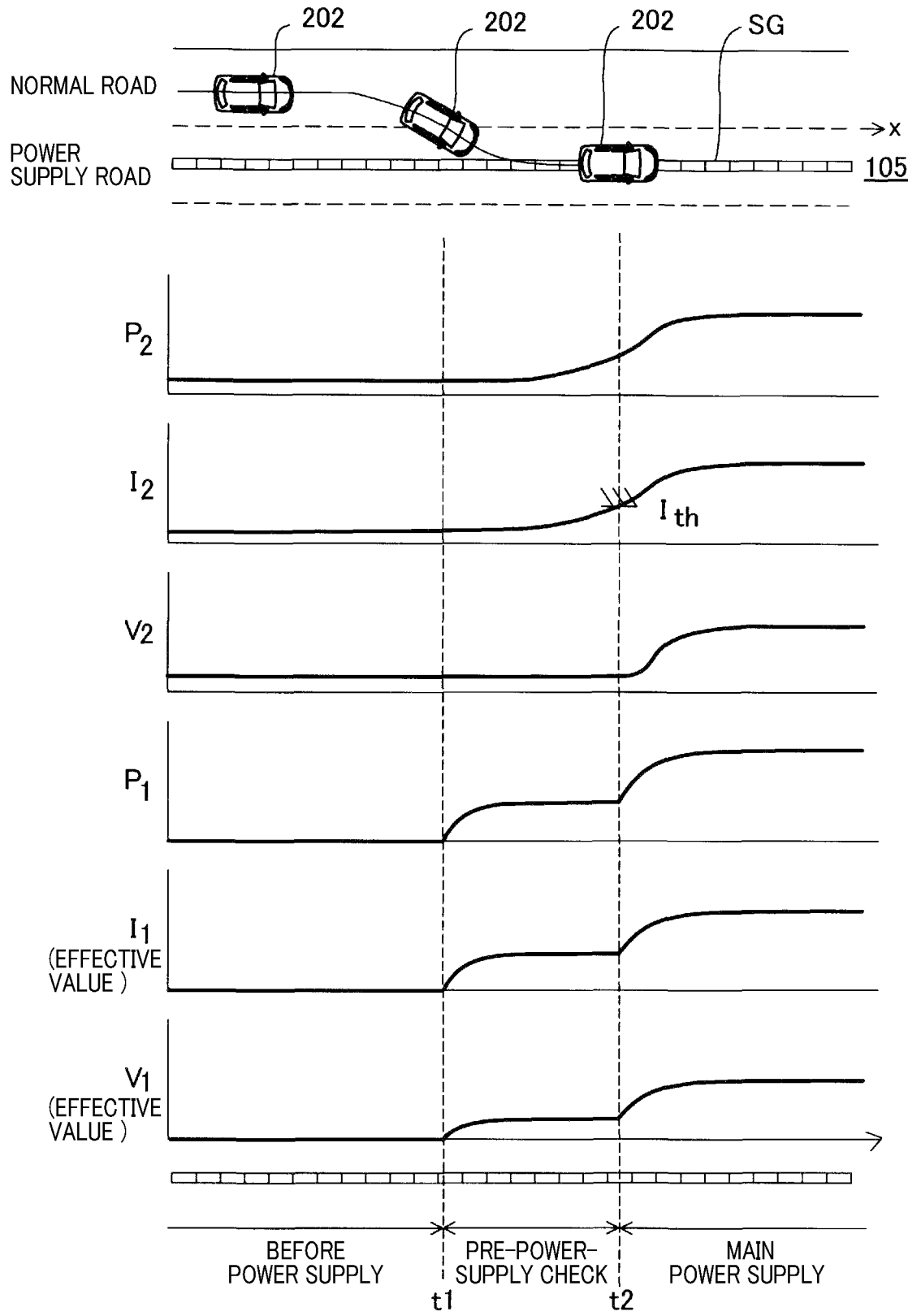
FIG. 4 is an explanatory diagram explaining a temporal change in voltage and current of each circuit during power supply.

In a case where the vehicle 202 travels on a normal road with no segment SG installed as illustrated in FIG. 4, all of the switching transistors Tr1 to Tr4 in the inverter circuit 32 of the power supply device 100 on the road 105 side are off. Thus, an output V1 from the inverter circuit 32 is zero and an output current I1 is also zero. In this case, no voltage is applied to the power transmission coil 40 and no current flows therethrough, so that neither voltage nor current is generated also in the power reception coil 240 of the vehicle 202. An output voltage V2 from the rectifier circuit 232 is zero and an output current I2 from the rectifier circuit 232 is also zero.

Wishing to receive power supply to the vehicle 202, a driver of the vehicle 202 makes a lane change from the normal road with no segment SG installed to a power supply road with the segments SG installed as illustrated in FIG. 4. At time t1, the power-receiving-side controller 220 of the vehicle 202, in response to detecting that the vehicle 202 moves to a position where an electric power can be supplied from the segments SG, performs pre-power-supply check. The power-receiving-side controller 220 may determine whether the position is available for power supply with reference to, for example, a strength of communication between the vehicle position detectors 20 and the vehicle-side position sensor 225. In a case where signals of the vehicle position detectors 20 have directionality, the communication is possible as long as the vehicle-side position sensor 225 is within a specific range relative to the vehicle position detector 20.

In the pre-power-supply check, the power-receiving-side controller 220 causes the power-supply-side controller 16 to fix an effective value $V_1$ of an output voltage of the inverter circuit 32 at a predetermined first voltage. The first voltage is a voltage lower than the output voltage of the inverter circuit 32 for performing main power supply. The power-supply-side controller 16 can set the effective value $V_1$ of the output voltage of the inverter circuit 32 to the predetermined first voltage by controlling a duty ratio of an output of the inverter circuit 32. It should be noted that the first voltage is preferably a low value when a relative position relationship between the power transmission coil 40 and the power reception coil 240 is sufficient for power transfer and, if possible, should be set at a minimum sufficient for power transfer. This is for the purpose of preventing occurrence of unnecessary loss during the pre-power-supply check. Further, it is desirable that in setting the output voltage at the first voltage, a filtering process be performed in order to avoid a transitional change in current. As illustrated in FIG. 4, to avoid a transitional phenomenon, a waveform of the effective value V1 of the output voltage at the time when the output voltage is fixed at the first voltage may be a simulated post-filtered waveform. The power-receiving-side controller 220 drives the switching transistors Tr25 to Tr28 of the DC-DC converter circuit 238, thereby fixing an input voltage $V_2$ of the DC-DC converter circuit 238 at a second voltage. The second voltage, which is set from a power consumption of a load, i.e., the auxiliary device 290, is set at a larger value with an increase in the power consumption of the device 290. $I_1$ denotes an effective value of the output current of the inverter circuit 32 and $I_2$ denotes the output current of the rectifier circuit 232. The currents $I_1$ and $I_2$ vary with a coupling coefficient k between the power transmission coil 40 and power reception coil. As illustrated in FIG. 4, the vehicle 202 makes a lane change onto the segment SG, which increases the coupling coefficient k. It should be noted that $P_1$ denotes electric power to be supplied by the power supply device 100 and $P_2$ denotes electric power to be received by the power reception device 20. $P_1=V_1*I_1$ and $P_2=V_2*I_2$.

The voltages $V_1$ and $V_2$, the currents $I_1$ and $I_2$, an inductance $L_1$ and an electric resistance $R_1$ of the power transmission coil 40, an inductance $L_2$ and an electric resistance $R_2$ of the power reception coil 240, and the coupling coefficient k satisfy a relationship represented by the following mathematical expression (1). A mathematical expression (2) is derived by solving the mathematical expression (1) in terms of coupling coefficient k. In the mathematical expression (2), $\omega=2\pi f$, where f denotes a frequency of the inverter circuit 32. Further, in the mathematical expression (2), a value of the coupling coefficient k, which is a value of 0 to 1, varies with the relative position between the power transmission coil 40 and the power reception coil 240 and increases with the power transmission coil 40 and the power reception coil 240 becoming close to each other.

[Math. 1]

[Math. 1]

$$\begin{bmatrix} V_1 \\ V_2 \end{bmatrix} = \begin{bmatrix} R_1 & j\omega k\sqrt{L_1 L_2} \\ j\omega k\sqrt{L_1 L_2} & R_2 \end{bmatrix} \begin{bmatrix} I_1 \\ I_2 \end{bmatrix} \quad (1)$$

[Math. 2]

[Math. 2]

$$k = \frac{V_1 \pm \sqrt{V_1^2 - 4R_1 I_2(V_2 + R_2 I_2)}}{2 I_2 \omega \sqrt{L1 L2}} \quad (2)$$

With the vehicle 202 making a lane change onto a power supply road, the relative position between the power transmission coil 40 and the power reception coil 240 become close to each other and the coupling coefficient k increases. In other words, in this case, when $V_2$ is set constant, the output current $I_2$ increases. Then, at time t2, the output current $I_2$ of the rectifier circuit 232 exceeds a threshold $I_{th}$. The threshold $I_{th}$ is a determination value for determining whether main power supply is to be performed. The power-receiving-side controller 220 sets the threshold $I_{th}$ to a value represented by the following mathematical expression (3) using the power consumption $P_a$ of the load, i.e., the auxiliary device 290, a power transfer efficiency $\eta_p$, and a battery voltage $V_b$ of the battery 210 at the time of start of the pre-power-supply check. The power transfer efficiency $\eta_p$, which is a total of a power transfer efficiency between the power transmission coil 40 and the power reception coil 240 and a conversion efficiency in the DC-DC converter circuit 238, is experimentally obtainable.

$$I_{th}=(P_a/\eta_p)/V_b \quad (3)$$

By virtue of the threshold $I_{th}$ being calculated and set in this manner, in a case where the output current $I_2$ of the rectifier circuit 232 exceeds the threshold $I_{th}$, the battery 210 can be charged with the electric power even though the load, i.e., the auxiliary device 290, consumes the supplied electric power.

The power-receiving-side controller 220 provides, in response to detecting the output current $I_2$ of the rectifier circuit 232 exceeding the threshold $I_{th}$, instructions for the main power supply to the power-supply-side controller 16 through communication from the power-receiving-side communicator 222 via the power-supply-side communicator 22. The main power supply is a process to be performed by the power-supply-side controller 16 to supply an electric power with the effective value $V_1$ of the output voltage of the inverter circuit 32 increased more than the first voltage. For example, the power-supply-side controller 16 increases the duty ratio of the inverter circuit 32 as compared with at the time t1, thereby making it possible to increase the effective value $V_1$ of the output voltage of the inverter circuit 32 more than the first voltage.

Figure 5:
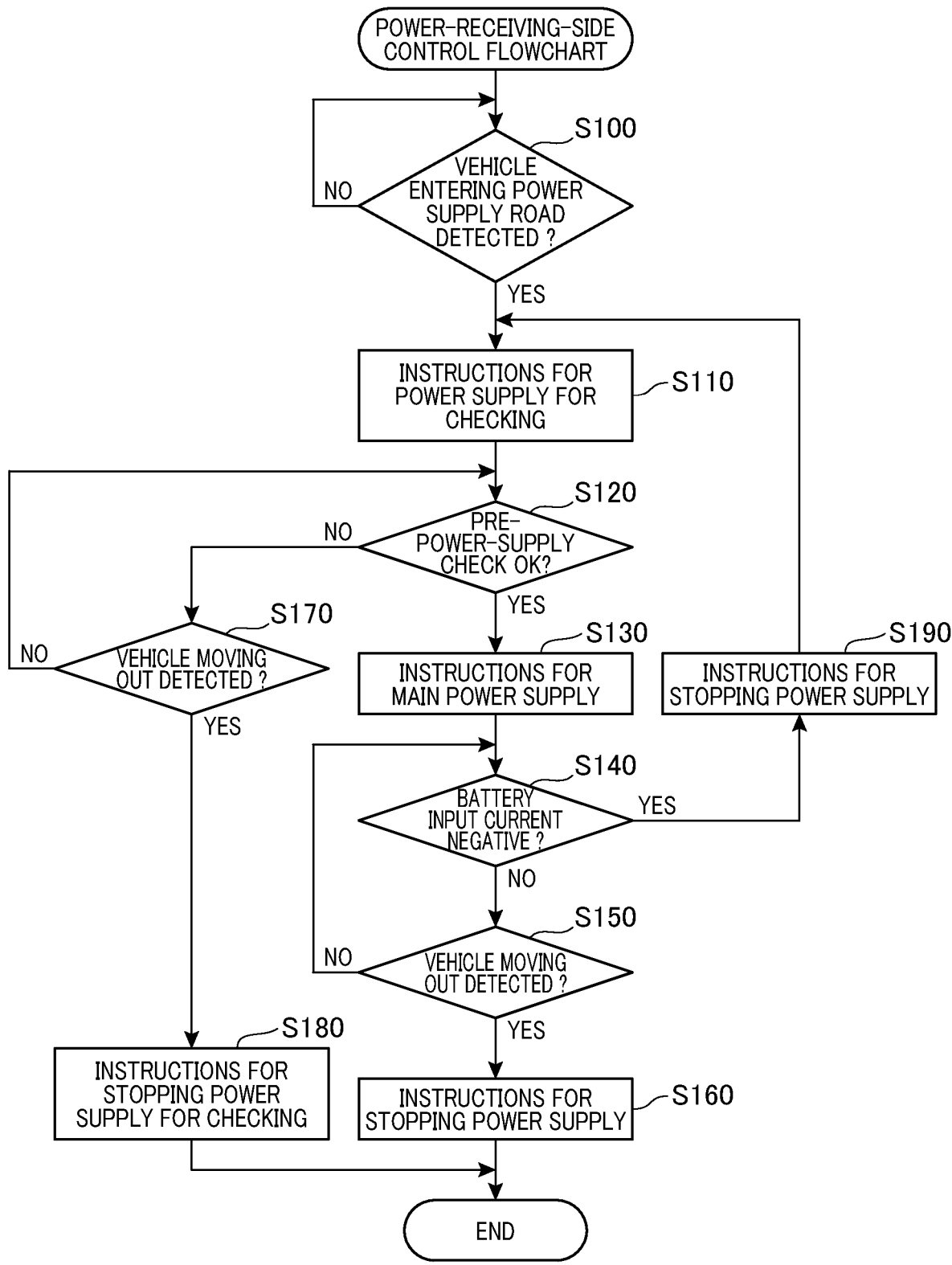
FIG. 5 is a power-receiving-side control flowchart.

Description will be given of a flowchart of power reception to be performed by the power-receiving-side controller 220 with reference to FIG. 5. When the power-receiving-side controller 220 detects that the vehicle 202 enters the power supply road based on a signal received by the vehicle-side position sensor 225 from the vehicle position detector 20 in Step S100, the process proceeds to step S110.

In step S110, the power-receiving-side controller 220 provides instructions for performing power supply for checking to the power-supply-side controller 16. The instructions are provided through communication from the power-receiving-side communicator 222 via the power-supply-side communicator 22.

In step S120, the power-receiving-side controller 220 fixes the input voltage of the DC-DC converter 238 to the predetermined second voltage by driving the DC-DC converter 238 and monitors the current $I_2$ flowing from the rectifier circuit. The pre-power-supply check is determined to be OK in response to the current $I_2$ being equal to the threshold $I_{th}$ or more and the process proceeds to step S130. The pre-power-supply check is determined to be not OK in response to the current $I_2$ being less than the threshold $I_{th}$, the process proceeds to step S170.

In step S130, the power-receiving-side controller 220 provides instructions for the main power supply to the power-supply-side controller 16.

In subsequent step S140, the power-receiving-side controller 220 determines whether the input current of the battery 210 is negative. The input current of the battery 210 being negative means that the battery 210 is not charged with an electric power but, inversely, an electric power is supplied from the battery 210. The power-receiving-side controller 220 cause the process to proceed to step S190 in response to the input current of the battery 210 being negative and causes the process to proceed to step S150 in response to the input current of the battery 210 being not negative.

When the power-receiving-side controller 220 detects that the vehicle 202 moves out of the power supply road based on a signal received by the vehicle-side position sensor 225 from the vehicle position detector 20 in Step S150, the process proceeds to Step S160. In Step S160, the power-receiving-side controller 220 provides instructions for stopping power supply to the power-receiving-side controller 16.

When the power-receiving-side controller 220 detects that the vehicle 202 moves out of the power supply road based on a signal received by the vehicle-side position sensor 225 from the vehicle position detector 20 in Step S170, the process proceeds to step S180. In step S180, the power-receiving-side controller 220 provides instructions for stopping the power supply for checking to the power-receiving-side controller 16. This is because even though approaching the power supply road, the vehicle 202 may then move away therefrom. In a case where the vehicle 202 does not move out of the power supply road, the power-receiving-side controller 220 causes the process to proceed to step S120, continuing the pre-power-supply check.

In step S190, the power-receiving-side controller 220 provides instructions for stopping the power supply to the power-receiving-side controller 16 and then causes the process to proceed to step S110.

Figure 6:
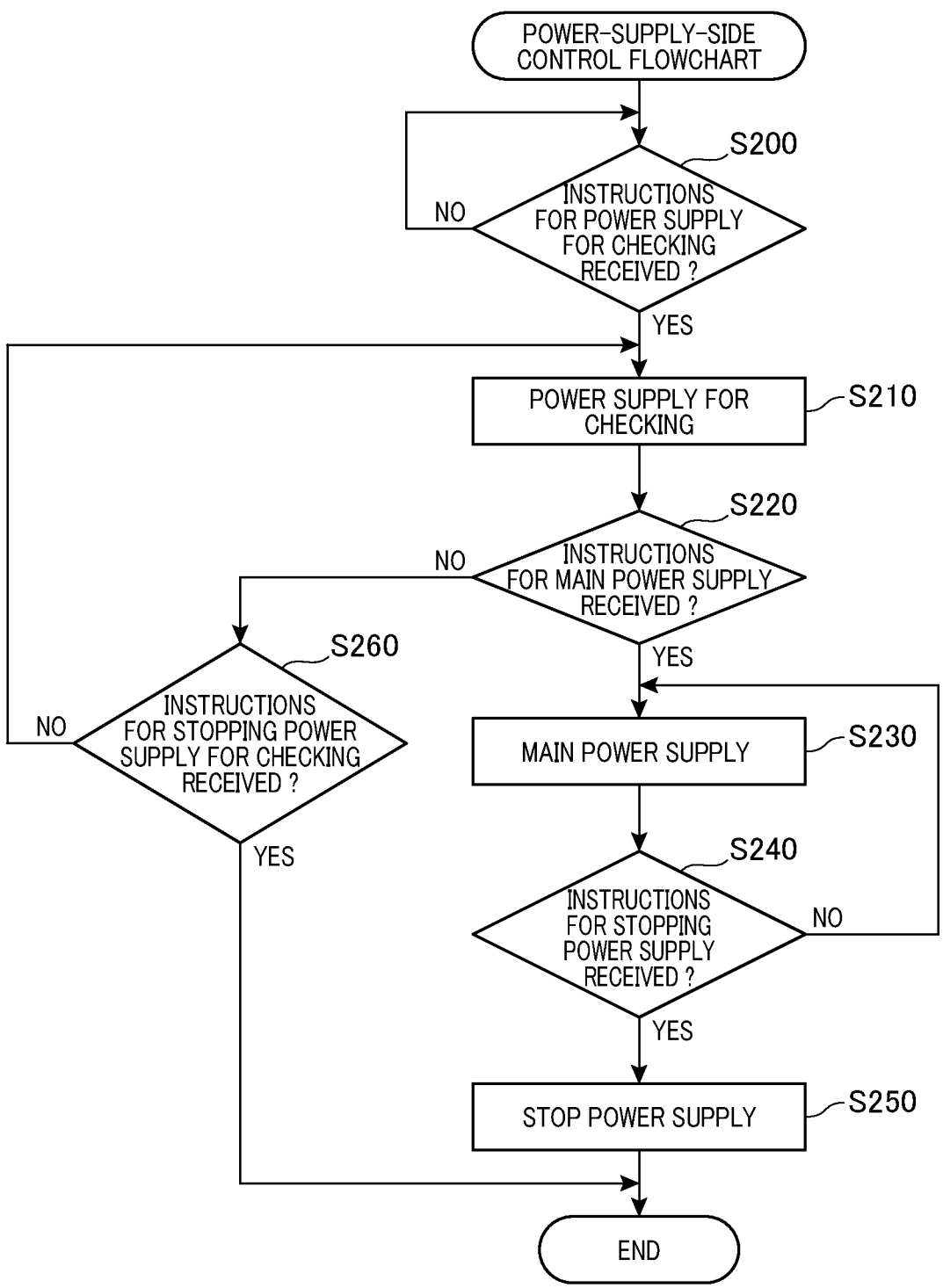
FIG. 6 is a power-supply-side control flowchart.

Description will be given of a flowchart of power supply to be performed by the power-supply-side controller 16 with reference to FIG. 6. In response to receiving the instructions for power supply for checking from the power-receiving-side controller 220 (step S110) in Step S200, the power-supply-side controller 16 causes the process to proceed to step S210. In step S210, the power-supply-side controller 16 controls on/off of the switching transistors Tr1 to Tr4 of the inverter circuit 32 such that the output voltage V1 of the inverter circuit 32 reaches the first voltage.

In response to receiving the instructions for main power supply from the power-receiving-side controller 220 (Step S130) in Step S220, the power-supply-side controller 16 advances the process to Step S230. In response to receiving no instruction for main power supply, the power-supply-side controller 16 advances the process to Step S260.

In Step S230, the power-supply-side controller 16 controls on/off of the switching transistors Tr1 to Tr4 of the inverter circuit 32 such that the output voltage V1 of the inverter circuit 32 reaches a voltage for main power supply higher than the first voltage.

In response to receiving the instructions for stopping the power supply from the power-receiving-side controller 220 (step S160 or S190) in step S240, the power-supply-side controller 16 causes the process to proceeds to step S250, stopping the power supply. In response to receiving no instruction for stopping the power supply from the power-receiving-side controller 220 in step S240, the power-supply-side controller 16 causes the process to proceed to step S230, continuing the main power supply.

In response to receiving the instructions for stopping the power supply for checking from the power-receiving-side controller 220 (step S180) in step S260, the power-supply-side controller 16 causes the process to proceed to step S250, stopping the power supply. In response to receiving no instruction for stopping the power supply for checking from the power-receiving-side controller 220 in step S260, the power-supply-side controller 16 causes the process to proceed to step S210, continuing the power supply for checking.

Thus, in the present embodiment as described, it is possible to simply check whether an expected electric power is to be received and the battery 210 is to be charged with it in a state where the power-supply-side controller 16 fixes the effective value $V_1$ of the output voltage of the inverter circuit 32 to the predetermined first voltage and the power-receiving-side controller 220 fixes the input voltage $V_2$ of the DC-DC converter circuit 238 to the predetermined second voltage.

It should be noted that with the voltage V2 fixed, the received electric power is proportional to the current $I_2$. Here, measurement of the current $I_2$ is easier than measurement of an electric power. Accordingly, the power-receiving-side controller 220 can easily determine whether to shift proceed to the main power supply process by comparing the current $I_2$ outputted from the rectifier circuit 232 with the threshold $I_{th}$ as described above. It should be noted that the power-receiving-side controller 220 may cause the power supply device 100 to start the main power supply in response to an electric power supplied from the power supply device 100 to the power reception device 200 during a pre-power-receiving check period becoming a predetermined electric power or more.

Further, in a case where electric power is to be supplied from the power supply device 100 to the power reception device 200, the main power supply is not performed while the coupling coefficient k is small and the power transfer efficiency is low but started in response to the power transfer efficiency reaching a sufficient level. This makes it possible to improve a power supply efficiency as a whole.

It should be noted that in a case where the received electric power is to be consumed by the motor generator 280 not via the battery 210, the power-receiving-side controller 220 may set the threshold $I_{th}$ to a value represented by the following mathematical expression (4), where $P_m$ denotes the power consumption of the motor generator 280.

$$I_{th}=(P_d/\eta_p-P_m)/V_b \qquad (4)$$

By virtue of the threshold $I_{th}$ being calculated and set in this manner, in a case where the output current $I_2$ of the rectifier circuit 232 exceeds the threshold $I_{th}$, the battery 210 can be charged with the electric power even though the power consumption $P_m$ of the motor generator 280 is taken into consideration.

The present embodiment is described by taking, as an example, a case where the power transmission coil 40 is provided as a power transmitter, the power reception coil 240 is provided as a power receiver, and an electric power is to be supplied from the power transmitter to the power receiver in a non-contact manner; however, a case where a power transmission terminal is provided as a power transmitter, a power receiving terminal is provided as a power receiver, and an electric power is to be supplied from the power transmitter to the power receiver with the power transmission terminal and the power receiving terminal being in contact with each other is also acceptable. In a contact-supply case, the coupling coefficient k is substantially 1 with an influence of resistance excluded. The power-receiving-side controller 220 can determine whether the main power supply is to be performed by providing instructions for power supply for checking and immediately comparing the current $I_2$ and the threshold $I_{th}$.

In the above-described embodiment, the power-supply-side communicator 22 and the power-receiving-side communicator 222 are provided and instructions for power supply for checking and instructions for main power supply are to be communicated between the power-supply-side communicator 22 and the power-receiving-side communicator 222. The communication between the power-supply-side controller 16 and the power-receiving-side controller 220 may be performed by, for example, superimposing a signal on an alternating current between the power transmission coil 40 and the power reception coil 240.

The present disclosure is not limited to the above-described embodiments and may be implemented in a variety of configurations without departing from the spirit thereof. For example, in order to solve a part or all of the above-described problem or achieve a part or all of the above-described effects, the technical features in the embodiments corresponding to the technical features in the aspects described in the section of Summary of the Invention may be replaced or combined, if necessary. Further, unless being described to be essential herein, the technical features may be omitted, if necessary.

What is claimed is:

1. A dynamic power supply system comprising:
a power reception device that receives a supplied electric power; and
a power supply device that supplies the supplied electric power to the power reception device, the power supply device comprising:
- an inverter circuit configured to output an alternating current;
- a power transmitter connected to the inverter circuit and configured to transmit an alternating-current electric power; and
- a power-supply-side controller configured to control the inverter circuit, the power reception device comprising:
- a power receiver configured to receive the alternating-current electric power transmitted from the power transmitter;
- a power reception circuit including a rectifier circuit configured to rectify the alternating-current electric power received by the power receiver and a DC-DC converter configured to convert and output a voltage rectified by the rectifier circuit;
- a battery connected to an output of the power reception circuit;
- a load configured to operate with electric power rectified by the rectifier circuit; and
- a power-receiving-side controller configured to control the DC-DC converter, wherein a period for the power-receiving-side controller to perform a pre-power-supply check prior to performing a main power supply process is provided, and the power-receiving-side controller is configured to:
- check the supplied electric power supplied from the power supply device to the power reception device, in a state where an effective value of an output voltage of the inverter circuit is fixed to a predetermined first voltage by the power-supply-side controller and an input voltage of the DC-DC converter is fixed to a predetermined second voltage by the power-receiving-side controller, in the pre-power-supply check; and
- cause, in response to determining that the supplied electric power is greater than or equal to a predetermined electric power, based on a current flowing from the rectifier circuit being greater than or equal to a threshold, the power supply device to start the main power supply process in which the supplied electric power is supplied from the power supply device to the power reception device.

2. The dynamic power supply system according to claim 1, wherein
the power-receiving-side controller is configured to set the second voltage in accordance with a power consumption of the load at a time when the pre-power-supply check is started.

3. The dynamic power supply system according to claim 1, wherein
the power transmitter comprises a power transmission coil,
the power receiver comprises a power reception coil, and
the electric power is supplied from the power transmitter to the power receiver in a non-contact manner.

4. The dynamic power supply system according to claim 3, wherein
the power-receiving-side controller is configured to calculate the supplied electric power based on a current and a voltage of the power reception coil, in the pre-power-supply check.

5. The dynamic power supply system according to claim 3, wherein
the power-receiving-side controller is configured to:
- detect a current supplied to the battery after the main power supply is started, continue the main power supply in a case where the current supplied to the battery is larger than zero, and
- stop the main power supply and perform the pre-power-supply check in a case where the current supplied to the battery is less than or equal to zero.

6. The dynamic power supply system according to claim 1, wherein
the threshold is a current value calculated by: (a power consumption of the load/an efficiency in the DC-DC converter)/(a voltage of the battery).

7. The dynamic power supply system according to claim 1, further comprising:
a motor generator configured to be driven by a received electric power not via the battery, wherein
the threshold is a current value calculated by: ((a power consumption of the load/an efficiency in the DC-DC converter)—a power consumption of the motor generator)/(a voltage of the battery).

* * * * *